Patented Feb. 11, 1930

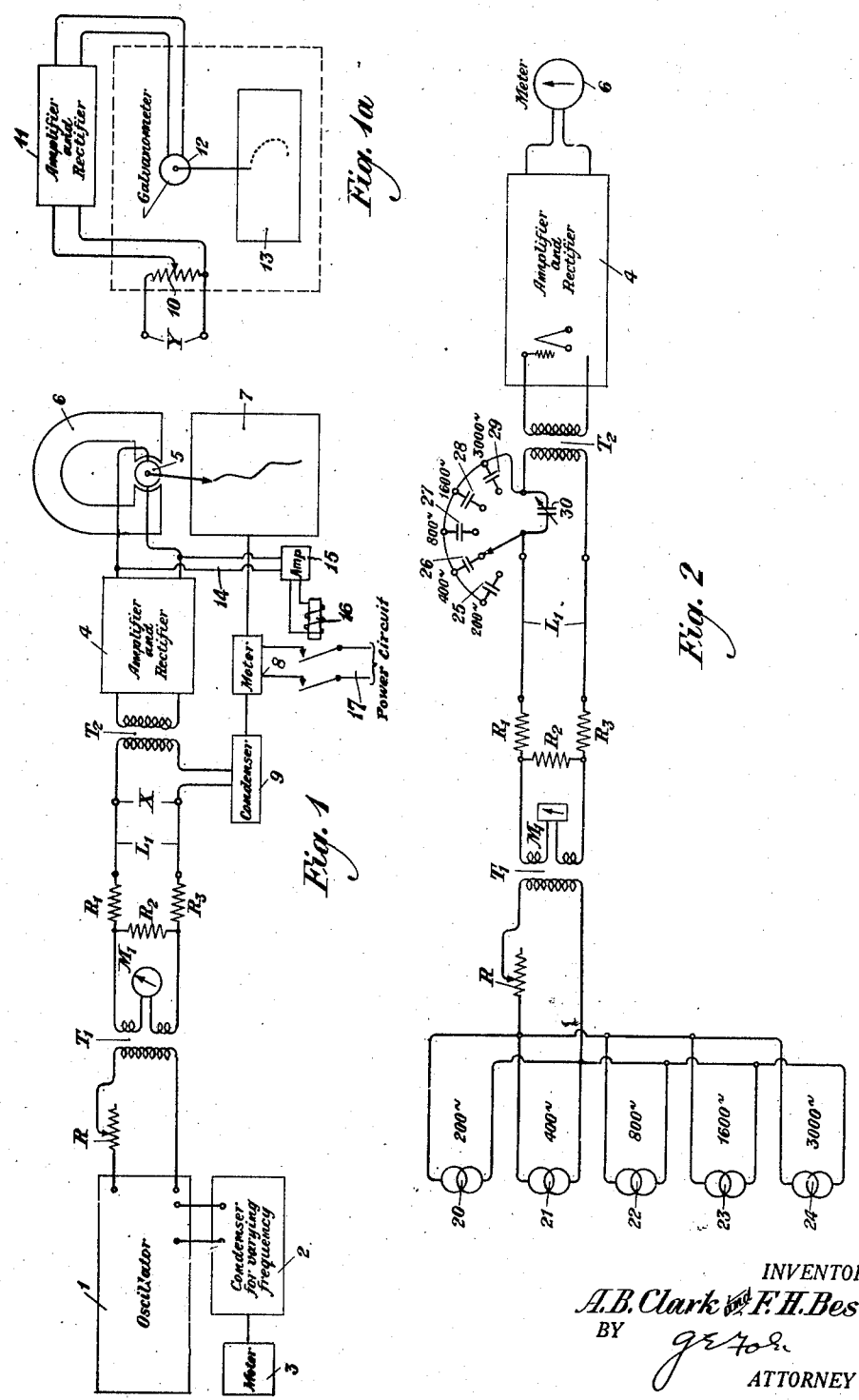

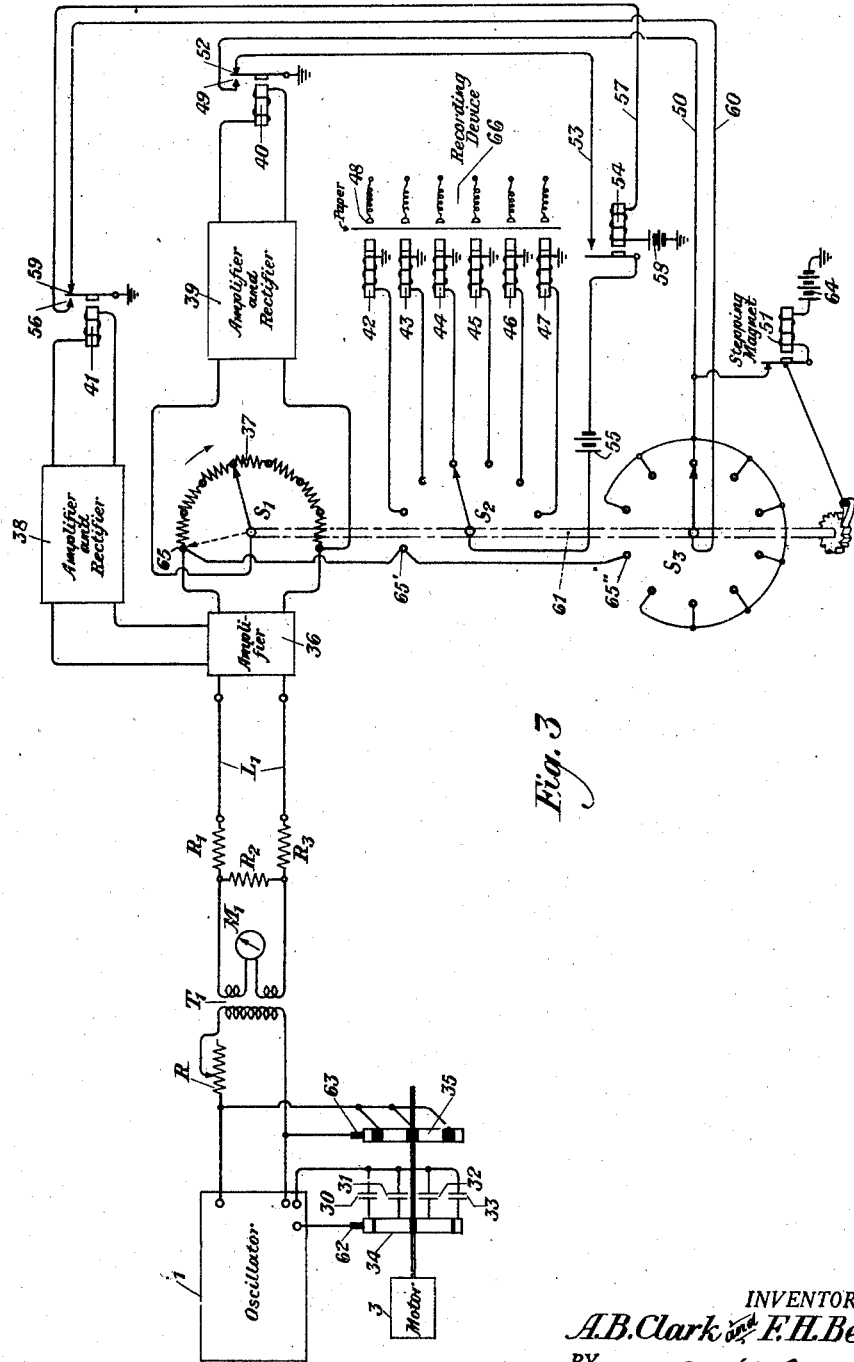

1,746,241

UNITED STATES PATENT OFFICE

ALVA B. CLARK, OF WYOMING, AND FRED H. BEST, OF WESTFIELD, NEW JERSEY, ASSIGNORS TO AMERICAN TELEPHONE AND TELEGRAPH COMPANY, A CORPORATION OF NEW YORK

TRANSMISSION-MEASURING SYSTEM

Application filed April 5, 1927. Serial No. 181,244.

This invention relates to transmission measuring systems and particularly to means for readily indicating or recording the transmission equivalent of a circuit at a plurality of frequencies.

Various systems have been proposed and used heretofore to determine the transmission equivalent of a circuit. Such systems have been designed to give very accurate results and require skill in their operation.

The object of this invention is to provide a system that will indicate or record the transmission equivalent of a circuit at various frequencies, the said system being characterized by greater simplicity of operation than the devices of the prior art.

Other objects of this invention will be apparent from the following description when read in connection with the attached drawing in which Figure 1 shows a form of embodiment of the invention having synchronized operation of the frequency controlling condenser at the transmitting end and the tuning condenser at the receiving end of the circuit; Fig. 1$^a$ is a variation applicable to Fig. 1; Fig. 2 is a form of the invention characterized by the simultaneous application of a plurality of frequencies; and Fig. 3 shows a form of the invention in which one of a plurality of frequencies is transmitted at any instant and further characterized by the use of selector switches at the receiving end to operate a potentiometer, the recording device and the restoring mechanism.

In Fig. 1 the line $L_1$ represents a circuit, the transmission equivalent of which is to be determined at each of a plurality of frequencies throughout a range of consecutive frequencies. A network consisting of the resistances $R_1$, $R_2$ and $R_3$, the impedance of which approximates the impedance of the line is connected between the transformer $T_1$ and the line $L_1$. A source of testing voltage is connected with the primary of the transformer $T_1$. An indicating or recording mechanism is connected by the transformer $T_2$ with the line $L_1$. The source of testing voltage comprises an oscillator 1 which preferably is of the vacuum tube type, having connected therewith a condenser 2 by means of which the frequency of the oscillations may be varied. This condenser is moved preferably at a uniform rate by the motor 3. In the preferred arrangement, the oscillator frequency would be changed from a minimum to a maximum in a short interval of time, such as one minute. The oscillator is connected with the primary winding of the transformer $T_1$, the connection including the resistance R by means of which the amplitude of the applied voltage may be controlled. A meter $M_1$ connected with the secondary winding of this transformer is used in the adjustment of the applied voltage.

The receiving apparatus comprises an amplifier and rectifier 4, the output side of which is connected with the moving coil 5 of a meter 6. This moving coil has connected therewith, either directly or indirectly, a pointer by means of which a record of the movement of the coil may be made upon the paper 7. This paper is carried upon a cylinder which is rotated by the motor 8 which operates in synchronism with the motor 3. Motor 8 also controls the variations of the condenser 9, which tunes the primary winding of the transformer $T_2$ to the frequency then being transmitted by the oscillator 1. The branch circuit 14 is connected with the output side of the amplifier-rectifier 4 in order to divert a part of the transmitted current for the purpose of controlling the motor 8. This branch circuit may have an amplifier 15 connected therewith if additional amplification is desired. The relay 16, which is operated by the current diverted by 14, controls the application of power by the circuit 17 to the motor 8. The manner in which the control is effected will be described later in connection with the general description of the measuring system.

In order to make a transmission measurement, the sending and receiving aparatus are connected to opposite ends of the line circuit $L_1$ and the motor 3 is started. As soon as this current is transmitted the motor 8 will begin to operate, by virtue of the operation of relay 16 by a portion of the rectified current that flows in circuit 14. By careful adjustment beforehand the resonating frequency of the condenser at the receiving end at any instant will be the same as the frequency then generated by the oscillator. Since both motors are operated at the same speed they will maintain this relation. As the frequency of the testing voltage changes by the variation of the condenser 2 the indication of the recording meter will change in proportion to the changes in attenuation of the circuit $L_1$ and the record obtained, namely the graph 7 will represent the transmission frequency characteristic of the line $L_1$ throughout the range of frequencies produced by the oscillator 1 for one cycle of the operation of the condenser 2.

If desired, a recording device of the type shown in Fig. 1ª may be substituted for the meter shown in Fig. 1 by connecting the terminals Y of the recorder across the terminals X of the circuit $L_1$. The type of recorder shown in Fig. 1ª is that which is known in the art as the Leeds and Northrup type which is fully described in the patent to M. E. Leeds, No. 1,125,699 which issued on January 19, 1915. With this arrangement connected across the line circuit at the points X the path of the testing current at the receiving end is through a potentiometer 10. This potentiometer is bridged across the input side of an amplifier and rectifier 11, the output side of which is connected with the moving coil 12 of a galvanometer. As clearly described in the Leeds patent this galvanometer coil does not make the record but controls the position of the contact on the potentiometer in such a way that the motion of the contact will reduce the galvanometer current. If the incoming current is constant the galvanometer current will be reduced by the mechanism until the galvanometer coil rests at its midscale, after which no other movement of the potentiometer takes place until the incoming current changes. The record which is traced upon the paper 13 is produced by the mechanism which controls the potentiometer contact. It should be understood that if desired, the resonating condenser 9 driven by the motor 8 may be employed in connection with the modification shown in Fig. 1ª by connecting this arrangement across the secondary of the transformer $T_2$ instead of across the terminals K.

In the arrangement shown in Fig. 2 in which the same designating symbols have been used to represent parts similar to those shown in Fig. 1, a plurality of oscillators of which five designated 20 to 24, have been shown for the purpose of illustrating the invention, are connected across the primary winding of the transformer $T_1$. The secondary is connected with the sending network $R_1$—$R_2$—$R_3$ which simulates the impedance of the line with which it is connected. At the opposite end of the line $L_1$ a plurality of condensers are connected or adapted to be connected with the primary of the transformer $T_2$ for the purpose of tuning it to a particular frequency the method of doing which will be described hereinafter. The circuit is connected by the transformer $T_2$ with an amplifier and rectifier 4, the output side of which is connected with a meter 6. This meter is calibrated to read directly the transmission equivalent of the line $L_1$. The manner in which this arrangement is operated to determine the transmission equivalent of the circuit $L_1$ is as follows: By means of the resistance R and the meter $M_1$ the voltage applied by the oscillators across the sending network $R_1$—$R_2$—$R_3$ is adjusted to a given value. Then the condensers 25 to 29 inclusive are successively connected with the line for the purpose of tuning the transformer to a particular frequency; thus when 25 is connected the transformer will be tuned to say 200 cycles. In like manner each of the other condensers will tune the transformer to one of the other frequencies transmitted. Fine adjustment of tuning is obtained by varying the condenser 30. This small condenser avoids the necessity of adjusting to a high degree of accuracy the condensers connected with the dial switch. When the transformer has been tuned to resonance, it will be indicated by the position of the needle of the meter 6 which should stand at its maximum when resonance exists. The reading given by the meter 6 indicates the transmission equivalent of the circuit $L_1$ at that frequency. In like manner the equivalents for each frequency throughout the range of frequencies produced by the oscillators 20 to 24 inclusive, may be obtained.

The arrangement shown in Fig. 3 in which also the same symbols have been used to indicate parts similar to those shown in Figs. 1 and 2, embraces a vacuum tube oscillator 1, the frequency of which is varied by successively connecting therewith each of a plurality of condensers 30 to 33 inclusive. The connection of these condensers with the tuning circuit of the oscillator is effected by means of the commutator 34 which is rotated at a predetermined rate by the motor 3. The shaft of this motor also serves to rotate a commutator 35 which serves to short-circuit the output of the oscillator 1 during the interval in which the frequency is being changed by the changing of the tuning condensers. The purpose of this operation will be made clear in describing the operation of the recording system. This system which is connected with the other end of the line $L_1$ comprises preferably an amplifier 36, the output of which is connected across the potentiometer 37 and also across the input of the amplifier and rectifier 38. The input side of an amplifier and rectifier 39 is connected across the potentiometer 37 so that the input voltage may be varied by the operation of this potentiometer. The output of the rectifier 39 is connected with the relay 40 and similarly the output of 38 is connected with the relay 41. The recording device 66 comprises a plurality of magnets 42 to 47 inclusive, each of which has its winding connected with one of the contacts of the selector switch $S_2$. These magnets when energized are adapted to attract a plunger such as 48 (associated with magnet 42), which plunger carries a number which will be stamped upon the paper that extends between the row of plungers and the faces of the magnets. Each plunger has a spring connected therewith to withdraw it from contact with the paper as soon as its magnet is deenergized. The front contact 49 of relay 40 is connected by conductor 50 with the contact of the stepping magnet 51 and also with certain of the contact points of the selector switch $S_3$, the function of which is to assist in the restoration of the recording system to normal after each measurement has been made. The back contact 52 of relay 40 is connected by conductor 53 with the contact of relay 54, the armature of which is connected with the movable arm of the switch $S_2$. This connection includes a source of potential 55. The front contact 56 of relay 41 is connected by conductor 57 with the winding of relay 54 which has a source of potential 58 connected therewith. The back contact 59 of relay 41 is connected by conductor 60 with the movable arm of the selector switch $S_3$. The movable arms of all of the selectors are mechanically connected with the shaft 61 so that they will be moved simultaneously thereby. This shaft is connected with the armature of the stepping magnet 51 so as to be rotated by the movements thereof.

The manner in which the system operates is as follows: When the motor 3 is operating, the condensers 30 to 33 inclusive, will successively be brought into the tuning circuit of the oscillator 1. Let it be assumed that the condenser 30 is connected with the tuning circuit so as to cause the production of oscillations of, for example, 200 cycles. When the brush 62 is in contact with the conducting segment of the commutator 34, the brush 63 of commutator 35 will be resting upon a nonconducting segment so that no short-circuit will exist across the output of the oscillator. The resistance R should be adjusted until the voltage across the input side of the network $R_1$—$R_2$—$R_3$, which will be indicated by the meter $M_1$ is of the desired value. A current of the frequency of 200 cycles will flow over the circuit $L_1$ to the receiving end where it will be amplified by 36 and as amplified will be impressed partly across the potentiometer 37 and partly across the input of the amplifier-rectifier 38. At the outset the movable arm of the selector switch $S_1$ is in the position shown by the dotted line so that the full voltage across the output of the amplifier 36 is impressed across the amplifier-rectifier 39 and the resultant output current operates the relay 40, thereby closing the contact 49. This establishes a circuit extending from the grounded armature through the contact 49, thence over conductor 50 and through the contact and winding of the stepping magnet 51 and through the battery 64 to ground. This energizes the magnet and the movement of its armature, which is connected with the shaft that controls the movable arms of the selector switches, causes the rotation of these arms simultaneously. At the same instant the output current of the amplifier-rectifier 38 energizes the relay 41 which causes the armature to touch the contact 56, thereby establishing a circuit from the grounded armature through contact 56 and over conductor 57 through the winding of relay 54 and the battery 58 to ground. Relay 54 is energized and through its contact a circuit is established from the open contact 52 through conductor 53, contact of relay 54, battery 55, movable arm of switch $S_2$ and through the contact point of the said switch to the winding of one of the magnets of the recording device. Since this circuit is open at contact 52 the magnet remains deenergized. The movable arm of the switch $S_1$ which controls the potentiometer 37 continues to rotate in the direction shown by the arrow causing with each step of rotation a reduction in the input voltage across the amplifier-rectifier 39. It should be borne in mind that since the movable arms of all of the switches are connected with the shaft 61 and move in synchronism the successive magnets of the recording device will be connected into the circuit extending from the contact 52. When the potentiometer 37 has been varied to such extent that the input voltage falls to such a level that the output current of the device 39 no longer keeps the relay 40 energized, its armature will drop back and put a ground upon the contact 52, thereby closing a circuit through the winding of that magnet of the recording device which is connected with the contact point of the switch $S_2$ upon which its movable arm is resting at the instant of deenergization of relay 40. Let it be assumed that the relative positions of the movable arms of the three switches are as represented by the solid lines in the drawing. Accordingly, the magnet 44 will be energized and the attraction of its plunger will cause the latter to print upon the paper strip a numeral which represents the transmission equivalent of the circuit for the particular frequency, say 200 cycles, then being transmitted. It will, of course, be seen that the input voltage of the amplifier-rectifier 38 remains constant so that the relay 41 continues to be energized as long as the 200 cycle current is being transmitted over the line. As the motor 3 continues to rotate it will bring the conducting segment associated with condenser 31 under the brush 62, thereby changing the frequency of the oscillations. When the brush 62 is passing from one conducting segment to the succeeding one, the brush 63 passes from a non-conducting segment to a conducting segment, thereby establishing a short-circuit across the output of the oscillator 1. This short-circuit causes the deenergization of relay 41 which puts a ground upon its contact 59, thereby establishing a circuit that includes the grounded armature, contact 59, conductor 60, the movable arm of the switch $S_3$, the contact point upon which the arm rests at the instant of stoppage of rotation, the contact of the stepping magnet 51 and the grounded battery 64. This circuit causes the stepping magnet to operate rapidly and to rotate the shaft 61 bringing the movable arms back to the initial contacts of each switch which are designated 65, 65' and 65" respectively. The system is now in its normal condition ready to measure the transmission equivalent of the line for the next frequency which may be assumed to be 400 cycles. It is desirable to point out that with the opening of contact 56 of relay 41, relay 54 becomes deenergized and with the opening of its contact the magnet 44 also becomes deenergized releasing its plunger so that the paper or other material upon which the record is being made may be moved by clockwork or other mechanism, such a distance that the next measurement, resulting from the transmission of the next testing frequency, may be printed upon clear space thereby avoiding any possibility of confusion.

While the invention has been disclosed as embodied in a particular form, it is of course obvious that the underlying principle may assume other forms without departing from the spirit and scope of the appended claims.

What is claimed is:

1. In a transmission measuring system, the combination with a source of alternating voltage the frequency of which varies with time of a circuit, the transmission equivalent of which is to be determined, and a transmission measuring device also connected with the said circuit and calibrated to record the transmission equivalent of the circuit in units of a transmission standard for each frequency transmitted over said circuit by said source.

2. In a transmission measuring system, the combination with a multi-frequency source of currents of a circuit connected therewith, the transmission equivalent of which is to be determined, and means also connected with the said circuit and responsive to the said currents to indicate the transmission equivalent of the said circuit at each of the said frequencies.

3. In a transmission measuring system, the combination with a circuit, the transmission equivalent of which is to be determined, of a source of alternating voltage connected with one end thereof, means connected with the other end thereof to amplify and rectify the received voltage, a relay connected with the output of the rectifying means, the said relay being energized as long as the rectified current exceeds a predetermined limit, a potentiometer connected between the said circuit and the said amplifying-rectifying means, a transmission equivalent indicating device comprising a plurality of recording units; switching means to vary the setting of the said potentiometer, a second switching means operable simultaneously with the said first switching means to connect successive units with the said relay, a stepping magnet operable as long as the said relay remains energized to operate the said selector switches, and means to energize that unit of the said indicating device which is connected with the said relay when the latter becomes deenergized.

4. In a transmission measuring system, the combination with a circuit, the transmission equivalent of which is to be determined, a source of alternating voltage having means connected therewith to periodically change its frequency and means to prevent transmission from the said source during the interval in which the frequency is being changed, and a transmission equivalent indicating system comprising means to automatically indicate or record the equivalent of the said circuit for each frequency, and means to restore the indicating or recording mechanism to normal whenever transmission from the said source of alternating voltage ceases.

In testimony whereof, we have signed our names to this specification this 2nd day of April, 1927.

ALVA B. CLARK.
FRED H. BEST.